Figure 3:
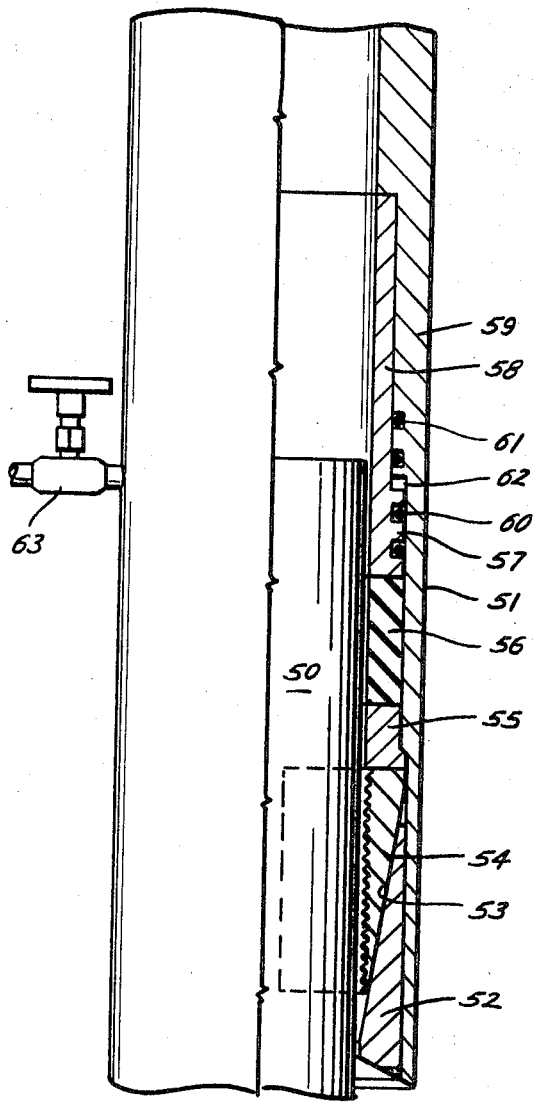

United States Patent

[11] 3,598,429

[72] Inventor James F. Arnold
P.O. Box 7197, Shreveport, La. 71107
[21] Appl. No. 815,831
[22] Filed Apr. 14, 1969
[45] Patented June 15, 1971

[54] HYDRAULIC COUPLING
8 Claims, 3 Drawing Figs.

[52] U.S. Cl. .................................................... 285/18,
285/81, 285/96, 285/322, 285/342, 166/86,
138/97
[51] Int. Cl. ....................................................... F16l 35/00
[50] Field of Search .......................................... 285/18, 96,
101, 104, 105, 106, 108, 145, 146, 147, 148, 348,
15, 342, 322; 166/86, 88, 187; 138/97, 99

[56] References Cited
UNITED STATES PATENTS
2,017,994 10/1935 Spang ........................... 285/105
2,702,202 2/1955 Kaiser ........................... 285/18
3,097,866 7/1963 Iversen ......................... 285/18

3,393,926 7/1968 Arnold .......................... 285/18

Primary Examiner—Dave W. Arola
Attorneys—Lee R. Larkin and Paul E. Harris

ABSTRACT: The coupling disclosed includes a housing for sliding over the end of a pipe length. Fluid under pressure is introduced into the housing to act against a piston therein. The piston moves axially of the housing and forces slips into gripping engagement with the pipe and compresses packing between the piston and the slips into sealing engagement with the housing and the pipe. When the coupling is to connect two pipe sections together or to repair a leak in one pipe section, two pistons are employed. The pistons move in opposite directions under the influence of fluid pressure, force-opposed sets of slips into engagement with the two pipe sections, and compress packing elements between each piston and its associated slips into sealing engagement with the outside surface of the two pipe sections or the outside surface of the pipe being repaired on opposite sides of the leak, if the coupling is being used for that purpose.

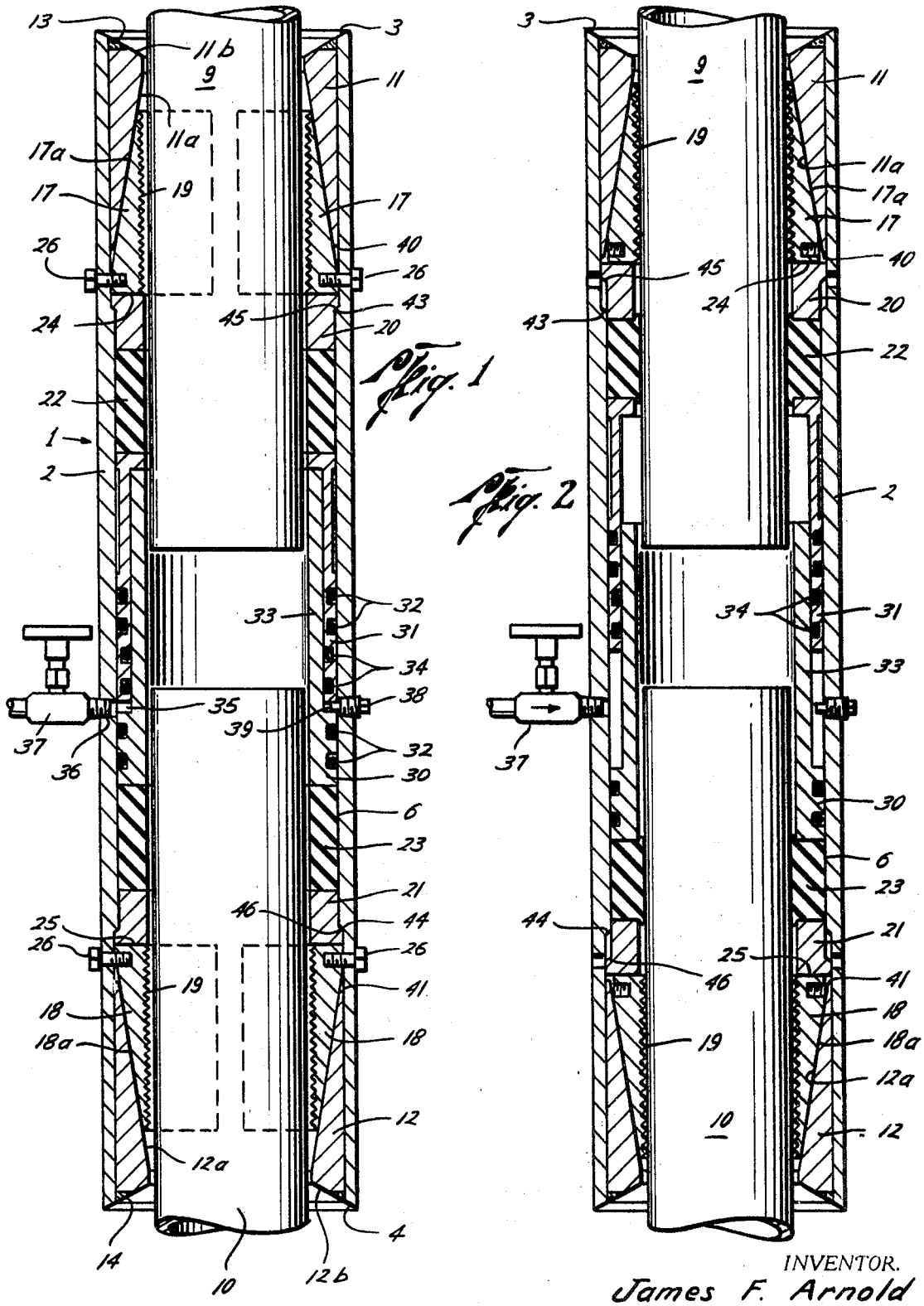

HYDRAULIC COUPLING

This invention relates to apparatus for joining together two lengths of pipe and for repairing a leak in a section of pipe.

A coupling of the type to which this invention relates is described in U.S. Pat. No. 3,393,926, which was issued to me on July 23, 1968 and is entitled "Hydraulic Coupling." The coupling described in this patent employed one or more movable pistons. Each piston forced gripping means, such as a set of slips, into gripping engagement with the pipe section to which the coupling was being attached. Each piston also compressed a packing element between the piston and the slips forcing the element into sealing engagement with the housing of the coupling and the outside surface of the pipe section. After the slips have been set and the packing element compressed to form a seal, the coupling operation was completed. The hydraulic pressure used to actuate the pistons would be left on the pistons to hold the packing elements in their compressed condition or a fluid would be used that would solidify in place between the pistons to hold them in position. In any event, after the coupling had been installed, if one of the gripping means should move away from its associated packing element, the compressive force in the packing element would be reduced. Usually, the gripping means are provided with teeth that engage the outside surface of the pipe. These teeth with time, due to vibrations in the pipeline, changes in the size of the pipe due to temperature changes, etc., will tend to bite deeper into the pipe and may gradually move further along the cam surface that forced them into their initial gripping engagement. If the movement of the gripping means is sufficient, the compressive force in the packing element will be lowered to the point where it will no longer maintain a seal between the housing of the coupling and the outside surface of the pipe and the coupling will leak.

It is an object of this invention to provide a coupling of the type described above wherein the compressive force in a packing element will be maintained above the minimum required to maintain a seal even should the pipe-gripping means abutting the packing element move away from the packing element far enough to reduce the compressive force in the element below said minimum.

It is a further object of this invention to provide such a coupling wherein the gripping means can move out of engagement with the packing element after it has been forced into sealing engagement with the pipe length and housing and the packing element will not move out of said sealing engagement.

Other objects, advantages, and features of this invention will be apparent to those skilled in the art from a consideration of this specification, including the attached drawings and appended claims.

By way of example, the coupling of this invention will be described in connection with the attached drawings in which, FIG. 1 is a vertical cross-sectional view of the preferred embodiment of the coupling arranged to connect two pipe sections or lengths together;

FIG. 2 is a coupling of FIG. 1 after it has coupled the two pipe lengths together; and FIG. 3 is an alternate embodiment of the invention, shown partly in section and partly in elevation.

In FIG. 1 and 2, coupling 1 includes elongated tubular housing or casing 2 having ends 3 and 4 and generally smooth cylindrical internal surface 6.

Means for securely engaging the two lengths of pipe 9 and 10 to be joined and for forming a permanent seal with these lengths of pipe are located inside casing 2 and occupy an annular area the inside diameter of which is slightly greater than the outside diameter of the two pipe lengths 9 and 10.

The above-mentioned means for engaging the pipe and forming a permanent seal include (1) means for securely gripping the lengths of pipe; (2) means for effecting sealing engagement with the pipe lengths; and (3) means for actuating said gripping and sealing means.

Guide means comprising annular members 11 and 12 are located inside housing 2 adjacent ends 3 and 4, respectively. The members are attached to the housing by welds 13 and 14. Guide members 11 and 12 have conically shaped inwardly tapering surfaces 11a and 12a. These surfaces face toward the transverse center of the coupling and provide first and second cam surfaces to actuate the gripping means to be described below. The members also have conically shaped, outwardly tapering surfaces 11b and 12b. These surfaces face away from the transverse center of the coupling and provide guide surfaces to help the coupling to be positioned over the ends of the pipe.

First and second gripping means are provided to grip the pipe lengths and hold the pipe from moving out of the coupling. In the embodiment shown, such means are slip segments 17 and 18. They are located with their tapered surfaces 17a and 18a in contact with conical surfaces 11a and 12a, respectively of the guide members, which act as slip bowls. Movement of the slips axially toward the ends of the housing they are adjacent will cause tapered surfaces 11a and 12a to move them inwardly into engagement with the pipe lengths 9 and 10 and wedge them between the pipe and surfaces 11a and 12a. Teeth 19 on the slips bite into the pipe and help the slips to anchor the pipe against movement out of the housing of the coupling. Machine screws 26 extend through the wall of the housing 2 and engage tapped holes in slip segments 17 and 18 to hold them against movement until the coupling is in position over the ends of the pipe lengths.

First and second seal assemblies are provided to sealingly engage the inner surface of the housing and the outer surface of the pipe. In the embodiment shown, the first such means includes compression ring 20 and annular packing element 22. The second includes compression ring 21 and annular packing element 23. Compression rings 20 and 21 abut end faces 24 and 25 of slip segments 17 and 18, respectively, and transmit axial force to the slips from packing elements 22 and 23, respectively. Packing elements 22 and 23 are made of a material that will deform under a compressive load and sealingly engage e outside surface of pipe lengths 9 and 10 and the inner surface of housing 2. Any suitable material may be used for the packing elements, such as rubber, asbestos, lead, and soft copper used alone or in combination.

Piston means are provided to move the packing assemblies axially to move the gripping means into engagement with the pipe and to compress the packing elements. In the embodiment shown, the piston means includes first piston 30 and second piston 31. Both pistons are annular with their outside diameter just less than the inside diameter of housing 2. Each piston is equipped with seal rings 32 that are in sliding, sealing, engagement with the inner surface of the housing. First piston 30 is integrally attached to cylinder 33, which extends through and is adjacent to the inner surface of second piston 31. Seals 34 carried by the second piston are in sliding sealing engagement with the outer surface of cylinder 33. This arrangement allows the pistons to be moved axially apart by injecting fluid under pressure into annular space 35 between the pistons. This fluid is injected through tapped opening 36 in the wall of housing 2. Valve 37 is mounted in tapped hole 36. The valve can be closed after the coupling is set to hold the pressure fluid injected from leaking out. Pipe plug 38 is mounted in a tapped hole in the sidewall of housing 2. Portion 39 of the plug extends into space 35 between the pistons. This portion 39 holds the pistons apart, as shown in FIG. 1 before the coupling is set.

In operation, the coupling, assembled as shown in FIG. 1, is slid over the ends of pipe lengths 9 and 10. The end of one pipe will have to be moved laterally or longitudinally for the coupling to be slid over the end of one or the other of the pipe sections, after which it can be brought back into alignment and the coupling slid into position over the end of the other pipe section.

Machine screws 26 are removed, releasing slip segments 17 and 18 for axial movement. Fluid under pressure is pumped through valve 27 into annular space 35 between the pistons. The pressure fluid forces first and second pistons 30 and 31 to move axially apart, which movement is transmitted to the slip segments through packing elements 22 and 23 and compression rings 20 and 21. Inclined cam surfaces 17a and 18a force the slip segments into firm engagement with the outside surface of the pipe links with teeth 19 of the slips biting into the surface of the pipe to hold the pipe against movement axially out of housing 2. After the slips have been set, continued movement of the pistons under the force of the pressure fluid, compresses packing elements 22 and 23, forcing them into sealing engagement with the inside surface of housing 2 and the outside surface of the pipe lengths, as shown in FIG. 2.

Preferably, a pressure fluid is sued to set the coupling that will solidify after a short period of time after which the pressure can be released from space 35. When the material is hardened, it will hold the pistons apart and the packing elements compressed.

As explained above, however, in operation there may be a tendency for slip segments 17 and 18 to move further toward the ends of housing 2. Such movement will reduce the compressive stress in the packing elements and may, if the reduction is sufficient allow the packing elements to move out of sealing engagement with the pipe and inner wall of the housing. To prevent this, stop means are provided to maintain the packing elements in sealing engagement with the pipe and the housing even though the slips move further along the cam surfaces. In the embodiment shown, annular members 11 and 12 are positioned with their end surfaces 40 and 41 close enough to compression rings 20 and 21, respectively, to limit the axial movement of the compression rings to that sufficient compressive force will be maintained in the packing elements, when the compression rings engage the ends of annular members 11 and 12, to mention a seal between the packing elements and the pipe and housing of the coupling. Thus, after one of the compression rings engages the end of one of members 11 and 12, the slip segment can actually move out of engagement with the compression ring without further decrease in the compressive force in the packing element. The distance initially between the compression rings and the ends of the annular member is sufficient to allow the coupling to be connected to the pipe, i.e., the slips set and the packing element compressed, before the compression rings engage the end of the annular members. The distance s small enough, however, for ends 40 and 41 to stop the movement of the compression rings in time to hold the packing elements in such sealing engagement.

Second stop means are provided to limit the movement of the compression rings toward the pistons. This second stop means is desirable so that when the coupling is being slid over the end of a pipe, should the pipe rub against one of the compression rings it would be moved axially in a direction that would tend to compress the packing element adjacent thereto. This could cause difficulty when installing the coupling on the pipe. In the embodiment shown, the second stop means comprises annular shoulders 43 and 44 on the inner surface of housing 2 and annular shoulders 45 and 46 on compression rings 20 and 21, respectively. These annular shoulders engage, as shown in FIG. 1, and hold the compression rings against axial movement toward the packing element, while the coupling is being installed.

FIG. 3 is an alternate embodiment of the coupling of this invention. This coupling is designed for connecting one pipe length to a manifold or the like. As shown, pipe link 50 extends into housing 51 of the coupling. Housing 51 is connected to the manifold, etc., (not shown). Positioned inside housing 51 and adjacent the end thereof is annular guide member 52. This guide member has an inclined conical surface 53, which forms a tapered slip bowl for slip segments 54, in the same manner as described above in connection with the FIG. 1 and FIG. 2 embodiments. Also, in the same manner, compression ring 55 and packing element 56 are located between piston 57 and slips 54. Piston 57 includes cylindrical portion 58, which extends into section 59 of housing 51 of enlarged diameter. Seal rings 60 on the piston and 61 in the inner surface of the housing isolate space 62. Into this space, pressure fluid can be injected through valve 63 and the coupling will be actuated in the same manner as described above to connect pipe link 50 to a manifold or whatever is attached to the other end of housing 51.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed with reference to other features and subcombinations. This is contemplated by and is within the scope the claims.

As many possible embodiments may be made of the invention without departing from the scope thereof, it is to be understood that all matter herein set forth or shown in the accompanying drawings is to be interpreted as illustrative and not in a limiting sense.

The invention having been described, what I claim is:

1. Apparatus suitable for use in connecting a length of pipe to a suitable tubular member in difficult working environments comprising: an elongated, generally tubular housing of a diameter greater than the diameter of the pipe length to be joined, said housing adapted to be fitted around said pipe length to define an axially extending annulus between the outer surface of said pipe length and the inner wall of said housing; an annular piston mounted in said annulus substantially free of contact with said pipe length, and in sliding and sealing engagement with the inner wall of said housing and a cylinder of smaller outside diameter than the piston attached to and extending axially from the piston, said housing having a section of reduced diameter in sliding and sealing engagement with the outer wall of the cylinder, an annular space being defined between said piston and said section of reduced diameter, an inwardly sloping cam surface on the inner wall of said housing axially spaced from said piston away from said section of reduced diameter, said surface facing toward said piston; gripping means disposed in said annular adjacent said cam surface and adapted to move axially upon actuation into contact with said cam surface and to be thereby radially moved into gripping engagement with said pipe length; a seal assembly including a packing element mounted in said annular between said piston and said gripping means and substantially free of contact with said pipe length, for movement axially by said piston an amount sufficient to move said gripping means against said cam surface, said packing element being compressed by said piston when the gripping means reaches the end of its travel into sealing engagement with the outer surface of said pipe length on one side and the inner wall of said housing on the other to effect a seal between said housing and said pipe length; stop means for limiting the distance the seal assembly can travel toward the cam surface, said stop means being located far enough from the seal assembly before he tool is actuated to allow the seal assembly to move the gripping means into firm engagement with the pipe and close enough to prevent the packing element of the seal assembly from relaxing sufficiently to move out of sealing engagement with the pipe and the housing should the gripping means move along its cam surface far enough to permit such relaxation after the gripping means are initially set, and a source of fluid under pressure remote from said housing, but connected though an opening in said housing into fluid communication with said annular space, whereupon entry of fluid under pressure into said annular space is effective to axially move said piston toward said cam surface.

2. Apparatus in accordance with claim 1, wherein said apparatus further comprises means to fix said piston in place with said gripping means in gripping engagement with said pipe and said packing element of the seal assembly in sealing engagement with said pipe.

3. Apparatus in accordance with claim 1 wherein said section of reduced diameter comprises a second piston which is free for sliding axial movement within said annulus away from said first piston member, and in which said apparatus is further provided with a second cam surface located on the opposite side of the second piston from the first cam surface, second gripping means disposed in the annulus adjacent the second cam surface for axial movement, a second seal assembly including a second packing element located between the second piston and the second gripping means to transmit the movement of the second piston to the second gripping means to move said means along the cam surface into gripping engagement with the pipe and to compress said second packing assembly between the second piston and the gripping means into sealing engagement with the pipe and the housing and a second stop means to limit the travel of the second seal assembly toward the second cam surface after said second packing element has been compressed into sealing engagement with the outside surface of the pipe length and the inner wall of the housing.

4. Apparatus suitable for connecting two lengths of pipe or for enclosing a leak in a pipe length comprising: an elongated, generally tubular, housing of a diameter greater than the diameter of the pipe lengths to be joined or repaired, said housing adapted to be fitted around the adjacent ends of said pipe lengths to be connected or the length to be repaired to define an axially extending annulus between the other surface of said pipe length or lengths and the inner wall of said housing; first and second annular piston members mounted in said annulus substantially free of contact with said pipe length in sliding sealing engagement with the inner wall of the housing, and a cylindrical member attached to one of the positions for movement therewith and extending therefrom toward and beyond the other piston and in sliding engagement therewith to form with the pistons and the inner wall of the housing an annular space, first and second inwardly sloping cam surfaces on the inner walls of said housing and axially spaced from said first and second piston members, respectively, with the surfaces facing toward said piston members; first and second gripping means disposed in said annulus adjacent the first and second cam surfaces, respectively, for movement axially into contact with said cam surfaces and to be thereby radially moved into gripping engagement with said pipe length; first and second seal assemblies including first and second packing elements mounted in said annulus between said first and second gripping means, respectively, and said pistons, and substantially free of contact with said pipe length, said seal assemblies being movable axially by said pistons as they move apart an amount sufficient to move said first and second gripping means along said first and second cam surfaces, respectively, into gripping contact with the pipe length and upon further axial movement of said piston for said first and second packing elements to be compressed into sealing engagement with the adjacent other surface of said pipe length on one side and the inner wall of said housing on the other to effect two axially spaced seals between said housing and the pipe length or lengths positioned inside each resilient means; stop means for limiting the distance the seal assemblies can travel toward their respective cam surfaces, said stop means being located far enough from the seal assemblies before the tool is actuated to allow the assemblies to move the gripping means into firm engagement with the pipe and close enough to prevent the packing elements thereof from relaxing sufficiently after being initially compressed into sealing to move out of sealing engagement with the pipe and the housing should either of the gripping means move further along its cam surface far enough to permit such relaxation after the gripping means are initially set, a source of fluid under pressure remote from said housing but connected through an opening in said housing into fluid communication with said annular space between pistons whereupon entry of fluid under pressure into said annular space is effective to axially move said pistons toward said cam surfaces.

5. Apparatus in accordance with claim 4 wherein said fluid pumped into said type space between the piston members is adapted to harden upon setting in said annular space to thereby lock said piston members in place with said gripping means in gripping engagement with said pipe and said packing elements in sealing engagement with said pipe.

6. The apparatus of claim 4 in which said first second seal assemblies include first and second annular compression rings located between the first and second gripping means the first and second packing elements.

7. The apparatus of claim 6 in which said stop means to limit the axial movement of the packing elements comprises the compression rings and the cam surfaces, the engagement of which limit said axial movement of the packing elements to hold the packing elements in said sealing engagement with the housing and pipe after the gripping means has moved axially out of engagement therewith.

8. The apparatus of claim 7 further provided with second stop means to limit the distance the compression rings can move toward the pistons to avoid subjecting the packing elements to a compressive load inadvertently when the apparatus is being installed.

UNITED STATES PATENT OFFICE
CERTIFICATE OF CORRECTION

Patent No. 3,598,429                          Dated June 15, 1971

It is certified that error appears in the above-identified patent and that said Letters Patent are hereby corrected as shown below:

James F. Arnold

Column 2, line 40, "e" should be --the--

Column 3, line 14, "sued" should be --used-- line 31, "to" should be --so-- line 45, "distance s" should be --distance is-- line 53, after "would" insert --not--

Column 4, line 15, after "scope" insert --of--

Column 5, line 27, "other" should be --outer-- line 32, "positions" should be --pistons-- line 34, after "sliding" insert --sealing--

Column 6, line 6, "other" should be --outer-- line 16, after "sealing" insert --engagement-- line 27, "type" should be --annular-- line 34, after "means" insert --and--

Signed and sealed this 22nd day of February 1972.

(SEAL)
Attest:

EDWARD M. FLETCHER, JR.
Attesting Officer

ROBERT GOTTSCHALK
Commissioner of Patents